United States Patent [19]

Sirkis

[11] Patent Number: 5,245,180
[45] Date of Patent: Sep. 14, 1993

[54] METAL COATED FIBER OPTIC DAMAGE DETECTION SENSORS WITH SYSTEM

[75] Inventor: James S. Sirkis, Burtonsville, Md.

[73] Assignee: University of Maryland, College Park, Md.

[21] Appl. No.: 892,127

[22] Filed: Jun. 2, 1992

[51] Int. Cl.$^5$ ............................................. H01J 5/16
[52] U.S. Cl. .................................. 250/227.16; 73/800
[58] Field of Search .................. 250/227.14, 227.15, 250/227.16; 73/800

[56] References Cited

U.S. PATENT DOCUMENTS

| | | | |
|---|---|---|---|
| 4,936,649 | 6/1990 | Lymer et al. | 250/227.14 |
| 5,015,842 | 5/1991 | Fradenburgh et al. | 250/227.15 |
| 5,029,977 | 7/1991 | Wheeler | 250/227.11 |
| 5,182,449 | 1/1993 | Johnson | 250/227.14 |

OTHER PUBLICATIONS

Dasgupta, J. S. Sirkis & C. Liu, "The Importance of Coatings to Structurally Embedded Optical Fiber Sensors", ISA Proceedings, New Orleans, LA., Oct. 1990, pp. 1673-1693.

*Primary Examiner*—David C. Nelms
*Assistant Examiner*—Stephone B. Allen
*Attorney, Agent, or Firm*—Christopher N. Sears

[57] ABSTRACT

Optical fiber sensor coated with linear work hardening elastic-plastic materials is provided that are used for a non-destructive optical damage detection sensor. The detection coating's intrinsic and extrinsic properties are critical on the sensor's continuous performance while being subjected to adverse environmental conditions. The damage detection sensor can also be used as an alternative to the conventional fiber fracture sensor for sensing impact damage. Other uses include maintaining a permanent record of the load/damage history of a loaded structure. A simple damage detection system is described that detects the sensor's permanent output phase-shift.

11 Claims, 8 Drawing Sheets

METAL COATED FIBER OPTIC DAMAGE DETECTION SENSORS WITH SYSTEM

FIELD OF INVENTION

This invention relates to a damage evaluation system and more particularly to a damage evaluation system using optical fibers, which enables the integrity of a component to be monitored in real time without requiring a structure to be dismantled since the sensor is a non-destructive type.

BACKGROUND OF THE INVENTION

Sensors that are fiber optically based are becoming increasingly common as accurate high-speed indicators of a wide variety of environmental conditions. Embedded fiber optic sensors are already finding use in the aerospace industry's push to build "smart structure" aircraft that fly-by-light. Due to benefits in power consumption, size, weight and immunity to electromagnetic interference, embedded fiber sensors will find use in the next generation of utility plants, skyscrapers and bridges. Potential advantages of the instant invention include: 1) a sensor that can monitor any structure during the entire manufacturing cycle with continuous monitoring of the structure's integrity at any localized section without a destructive effect on the sensor; 2) a sensor that can monitor a structure's deformation during its lifetime; and 3) a sensor that can monitor perforation, low velocity impact, fatigue, and overload damage to a structure.

Prior inventions that have taught of using optical fibers for damage sensing include: 1) U.S. Pat. No. 5,015,842 where the optical fibers are placed in a pattern of a structure so that when an optical fiber is fractured, a zone of structural damage is detected; and 2) U.S. Pat. No. 4,936,649 which teaches of a damage sensor detector which again uses optical fiber fracture to detects localized damage within a structure prone to cracking or delamination at known loads. Both of these sensors have the disadvantage of being destroyed once structural failure occurs. To overcome this problem, the present invention is a non-destructive type sensor.

The present invention use unobvious analytical design techniques using linear work-hardening elastic-plastic metal coatings which can permanently deform in response to a preset damage load. The basic concept of using a fiber optic damage detection device was first mentioned in Dasgupta, A., Sirkis, J. S., and Liu, C., "The importance of Coating to Structurally Embedded Optical Fiber Sensors," Proceedings of ISA International Conference, New Orleans, pp. 1673–1693, 1990. This article discusses the design of linear elastic metal coatings which minimize concentrations of transverse stress components in the host material and sensor that are induced by structurally embedded optical fibers. However, this teaching does not disclose the instant device's critical geometrical and material design features required for durable, reliable and continuous use under adverse environmental conditions.

SUMMARY OF THE INVENTION

The invention is an optical fiber damage sensor with associated system where plastic deformation in its detection coating is used as a means of remembering large strains. The detection coating material properties (Young's modulus, yield strength, coefficient of thermal expansion among others) and the critical coating radius of the material can be chosen such that permanent deformation will occur at a preset strain level. This sensor is not damaged by the structural damage so that post-damage measurements are possible. This sensor can be used as a real-time damage detection device or a device which is checked periodically. The metal coating concept can be used with any intrinsic optical fiber sensor device.

Accordingly, one object of the invention is to provide an improved damage detection sensor with associated system.

Another object of the invention is to provide a non-destructive evaluation sensor for smart structures.

A still further object of the invention is to provide a passive, very simple, low production cost and structurally integrable sensor.

A still further object of the invention is to make a sensor where post damage measurements are possible.

A still further object of the invention is to make a sensor where continuous monitoring is not required.

Another object of the invention is to produce a sensor where the optical fibers become more robust with time which provides for a more reliable sensor.

DETAILED DESCRIPTION OF THE INVENTION

A. Analytical Development

Figure 1:
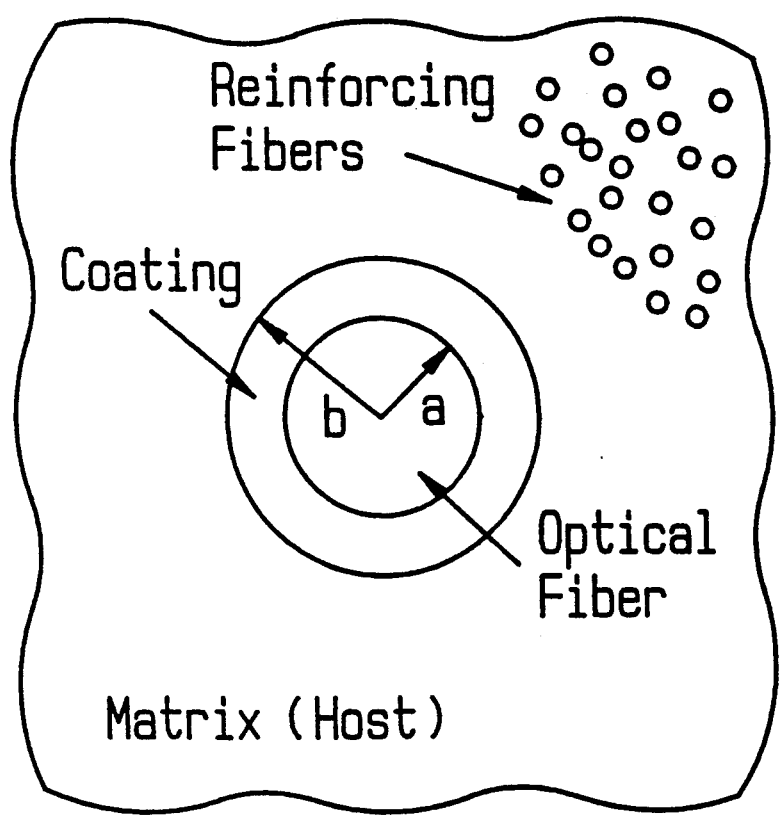
FIG. 1 shows a metal coated optical fiber cross section in a host material.

The analytical solutions required to describe the effect of the coating on the instant sensor performance uses the nonlinear analysis which provides information on stress fields under axial stress and/or thermal loading. These solutions use generalized plane-strain, axi-symmetric analytical techniques based on plastic flow equations in concentric cylinders. The glass fiber is treated as linear elastic while the metal coating is treated as an isotropic work hardening material obeying a von Mises yield criterion with an associated Prandtl-Reuss flow rule. The displacement field is obtained in this case by explicitly integrating the axi-symmetric differential equations which govern the equilibrium of the stress-rate tensor and the compatibility of the strain-rate tensor in the fiber and its coating. The geometry in this case consists of a coated optical fiber composed of a glass core and cladding surrounded by a coating material. The core and cladding are treated in this analysis as single elastic cylinder of radius "a" surrounded by a linear isotropic work hardening hollow cylinder of outer radius "b" within a host material, see FIG. 1 with reinforcing fibers. The equations which govern the radial and tangential deformation of the fiber-coating system ultimately depend on four unknown constants of integration, on the unknown axial strain rate, on the axial load rate, and the temperature rate distribution. The integration constants and axial strain rate are computed by satisfying: 1) continuity of displacement and traction rate fields across the interface between the fiber and coating, 2) zero traction on the coating outer surface, 3) equilibrium in the axial direction, and 4) finite, bounded stress rates at the fiber center. Additional equations are required which describe the plastic deformation in the coating. These equations can be obtained from the incremental theory of plasticity by using the Prandtl-Reuss flow-rule, the von Mises yield criterion, and the constitutive model for the coating material. This solution uniquely determines the strain and stress rate fields in the fiber and coating materials as a function of radius. The method of successive approximations is used to solve for all unknown parameters

B. Sensor Response to Mechanical Load

The influence of the plasticity in the metal coating on the phase response in an interferometric optical fiber sensor is of prime interest in this section since the end goal is to maintain a permanent record of damage-induced residual strains, in the form of a permanent phase shift in the fiber sensor output. The strain state calculated following the methods described in this section can be used with the phase-strain-temperature equation shown below to predict the response of an elastic-plastic metal coated interferometric optical fiber sensor.

$$\Delta\phi = \beta_o \int_\Gamma (S_1 - \tfrac{1}{2} n_o^2 (P_{2j} + P_{3j}) S_j + \xi T) ds, \quad (1)$$

where $\Delta\phi$ is the induced phase-shift in the fiber sensor, $P_{ij}$ are the Pockels' constants, $S_j$ is the vectorial representation of the symmetric strain tensor in the fiber, $\beta_o = 2\pi n_o/\lambda$ is the free space propagation constant, $n_o$ is the refractive index of the fiber in the unstrained state, $\xi$ is thermal-optic coefficient, T is temperature, and $\Gamma$ is the fiber geometric path. Thus if an axial force or a thermal load history is specified, Equation (1) provides the resulting phase history. The optical properties used in this disclosure are provided in Table 1.

TABLE 1

| Fiber Parameter | Symbol | Value |
|---|---|---|
| Pockels' Constants | $P_{11}$ | .121 |
|  | $P_{12}$ | .270 |
| Refractive Index | $n_o$ | 1.456 |
| Wavelength | $\lambda$ | 632.8 nm |

Figure 2:
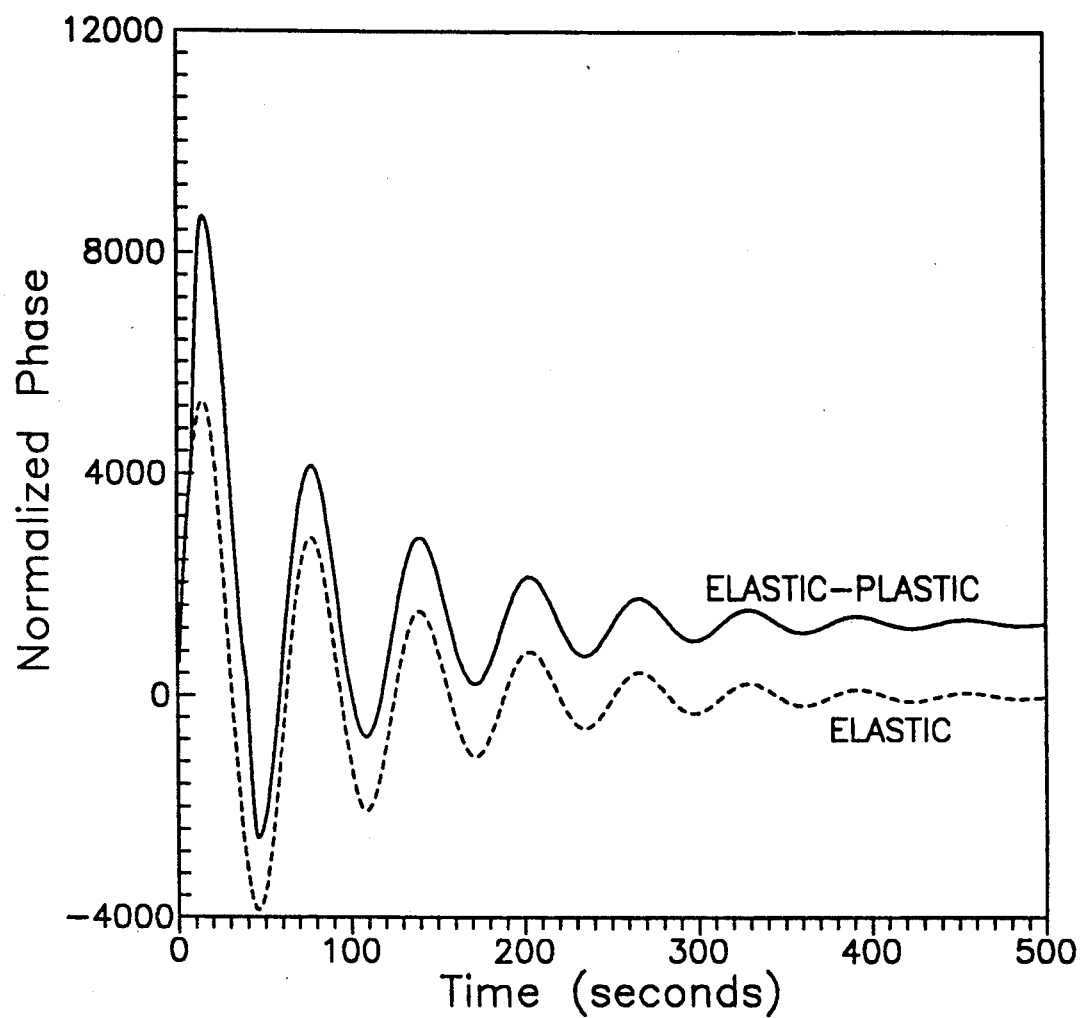
FIG. 2 shows a response of an aluminum alloy coated optical fiber sensor to axial loading.

Consider, for example, the following load history $$A(t) = A_o e^{-\gamma t} \sin(\zeta t), \quad (2)$$

where t is time; A(t) is the load which can be either temperature rate T(t) or axial force rate P(t); $A_o$, $\gamma$, and $\zeta$ are arbitrary amplitude, frequency, and decay constants, respectively, of a harmonic forcing function. FIG. 2 shows the normalized phase response of a 125 μm diameter optical fiber with a ductile Aluminum alloy coating of 250 μm outer diameter and a yield strength of 290 MPa. The fiber is assumed to be homogeneous with properties of fused silica. The load history parameters in Equation (2) are selected to be: A = 60.0 N, $\zeta = 0.1$ s$^{-1}$, and $\gamma = 0.01$ s$^{-1}$, and are intended to represent typical structural response to impact loading. The normalized phase in FIG. 2 is defined as $\overline{\Delta\phi} = \Delta\phi/\beta_o L$, where L is the length of the fiber sensor. For comparison, the phase of an identical elastic fiber-coating system (non-damage detection coating system) is shown in FIG. 2 as well.

The thermal and mechanical properties of the aluminum used to produce FIG. 2, as well as the properties of other candidate coating materials, are provided in Table 2. Both phase histories in FIG. 2 exhibit the basic

TABLE 2

|  | Ag | Cu | Au | Al | SiO$_2$ |
|---|---|---|---|---|---|
| E (GPa) | 76 | 120 | 83 | 70 | 69 |
| $\sigma_o$ (MPa) | 303 | 300 | 207 | 150 | — |
| $\nu$ | .37 | .35 | .36 | .33 | .19 |
| $\alpha$ (μϵ/°F.) | 10.9 | 9.3 | 7.9 | 13.1 | 0.44 |

E = Young's Modulus
$\sigma_o$ = Yield Strength
$\nu$ = Poisson's Ratio
$\alpha$ = Coefficient of Thermal Expansion behavior of a damped sinusoidal function. The sensor with the plastic coating shows deviations from the elastic behavior in the first peak above $\overline{\Delta\phi} = 4080$, in the second peak below $\overline{\Delta\phi} = 229$, and in the residual phase shift (indicating damage) as time reaches 500s. Larger strains generally occur during plastic deformation than in elastic deformation; therefore larger phase shifts necessarily occur in these regions of the load history. Further, the plastic deformation in the coating is large enough that a residual plastic strain results in a residual phase shift as the axial force becomes zero.

Figure 3:
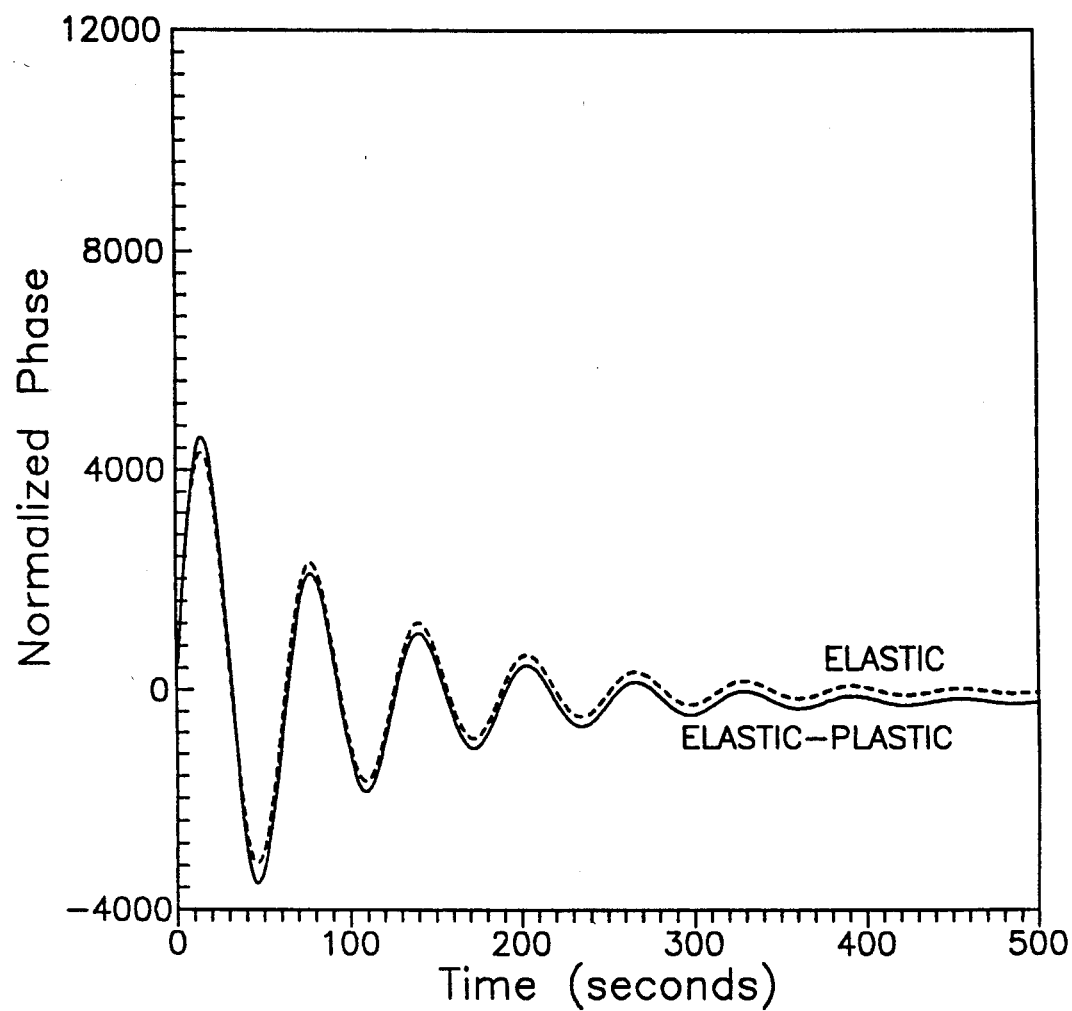
FIG. 3 shows a response of an aluminum alloy coated optical fiber sensor to thermal loading.

The phase response to temperature is explored in the same way as the response to axial force. For simplicity, the temperature profile is assumed to be radially uniform. The same form as in Equation (2) is assumed for the temperature history, with A = 1000° F., and with all other parameters maintained the same as before. For convenience, no axial preload is applied. FIG. 3 displays the resulting phase response for the same coating material and radius as used in FIG. 2. The plasticity-induced deviation of the sensor response from the loading function is evident in the first peak above $\overline{\Delta\phi} = 1878$, in the reverse peak of the first cycle at $\overline{\Delta\phi} = -45$, and in the second peak at $\overline{\Delta\phi} = 1123$. By comparison with FIG. 2, one can see both work hardening induced clipping of the early phase peaks and the residual phase shift which remains when the initial axial load and/or temperature is restored. FIG. 3 also shows that the magnitude of the permanent deformation in this material system is much less sensitive to temperature than to axial load.

The characteristics which are most dominant in FIGS. 2 and 3 are the residual phase shifts which occur after the mechanical or thermal stress states exceed some critical level. Subsequent post-yield phase response is due to purely elastic strains superimposed on the plasticity induced residual (or mean) level. This behavior means that ductile metal coated optical fiber sensors can be used as a threshold damage detection device by choosing a coating to plastically deform at a predetermined stress state. The phase responses in FIGS. 2 and 3 further means that the post-yield fiber can continue to perform as a strain sensor. The concept of the metal coated fiber sensors are very similar to those for the fiber fracture type of damage detection sensor with two exceptions: (1) The metal coated sensor is still usable after damage occurs, and (2) the magnitude of the load damage can be monitored in real-time by the amount of permanent phase shift as compared to the binary measurement possible with a fiber fracture type of sensor.

C. Coating Design

The sensor's detection coating material properties and geometry, i.e. (b/a) ratio, is critical for effective sensor operation. The desired operation for the sensor is the onset of plastic deformation in the host material which is recorded as a permanent phase shift at the sensor output which ultimately is indicative of the damage state in the host material in which the sensor is bonded to or embedded in, e.g. composite materials, see FIG. 1. The 0.02% offset point is usually used to designate the proportional limit in a uniaxial stress-strain curve of ductile materials.

Since optical fiber strain sensors are generally very sensitive devices, the phase shift in an uncoated single mode optical fiber experiencing an axial strain equal to one quarter of the 0.02% offset, i.e. 500 $\mu\epsilon$, is chosen as representing definitive and detectable permanent phase shift. This choice, though arbitrary, is motivated by typical sensor performance.

Figure 4:
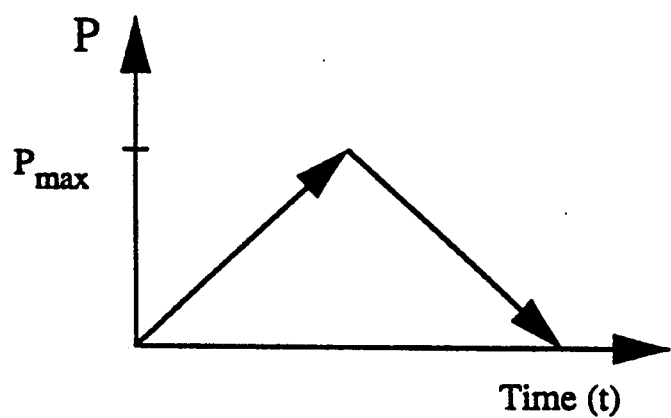
FIG. 4 shows a form of the load history used in parametric studies.

The response of the instant metal coated optical fiber sensor to axial force loading is examined. The emphasis is on discerning the dominant characteristics or design parameters for a required damage detection sensor. The analytical requirements for a durable sensor include the combination of coating material properties and radius which will result in a permanent phase shift in the sensor system at a prescribed threshold damage level load to the host material structure. A ramp loading and unloading load path, as depicted in FIG. 4, is used for both the axial force and thermal load to illustrate the sensor response characteristics. This choice is arbitrary and empiracally reproducible. The fiber material properties (Table 2) and radius (125 $\mu$m) are held fixed for all of the results provided in the following sections.

In the post-yield regime, the permanent phase shift results from both the axial and radial stresses in the optical fiber. This dependence on radial stress means that the sensor's output response is a function of the detection coating's Young's modulus, Poisson's ratio, and radius. The coating material yield strength influences the onset of permanent phase shift since yield strength is the threshold stress level used in the von Mises yield criterion. The coating radius is a critical design feature of the damage detection sensor since a change in coating radius results in a corresponding change in the axial stress, which in turn alters the initiation of yield. For effective operation of a sensor, the actual sensor requires a design that corresponds with $P_{max}$ as in FIG. 4 where the detection coating radius determines the permanent phase shift in the sensor output. $P_{max}$ is the threshold force which initiate damage in the structure being monitored.

In the sensor design, as the coating radius approaches that of the fiber, then regardless of notwithstanding the coating material used, no amount of axial load will result in a permanent phase shift. In this case, elastic unloading stresses in the fiber overcome the residual stresses in the coating. On the other extreme, as the coating radius becomes infinite, so too must $P_{max}$ in order to cause permanent deformation in the coating. Both of these characteristics are exhibited in FIG. 5 where $P_{max}$ is shown as a function of the critical b/a dimensional ratio for several metal coating materials whose properties are listed in Table 1. Aluminum, Gold, and Silver are used as coating materials in this case since they are commonly used as hermetic coatings, while Copper is added since it has relatively high Young's modulus. $P_{max}$ is normalized in FIG. 5 by the axial force, $P_{PT}$, in a stripped single mode fiber at the common proof test level of 344.8 MPa (50 ksi). The proof tested level is not indicative of the ultimate tensile strength of a metal coated fiber since the stresses for a given axial force become smaller as the coating diameter becomes larger.

Figure 5:
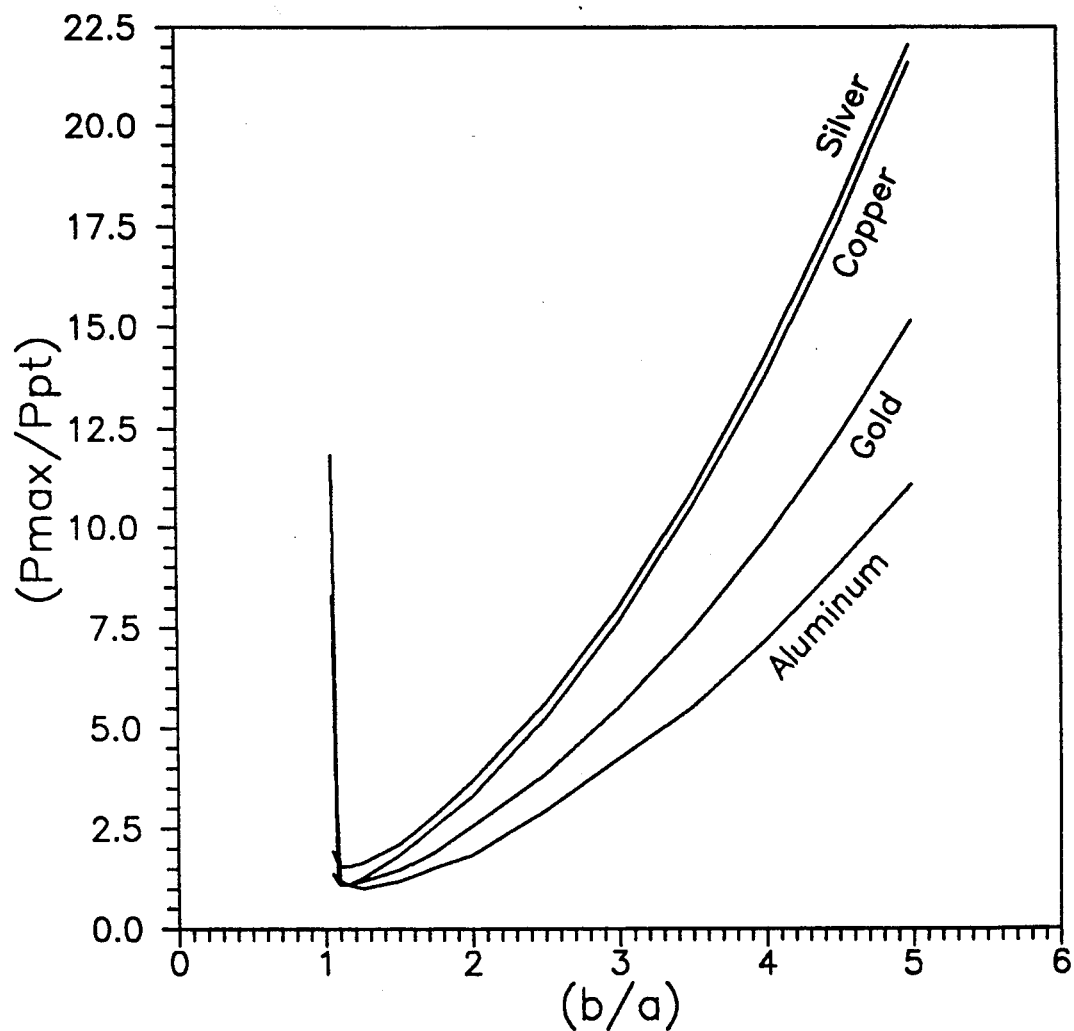
FIG. 5 shows an axial load damage threshold as a function of coating thickness or several coating materials.
Figure 6:
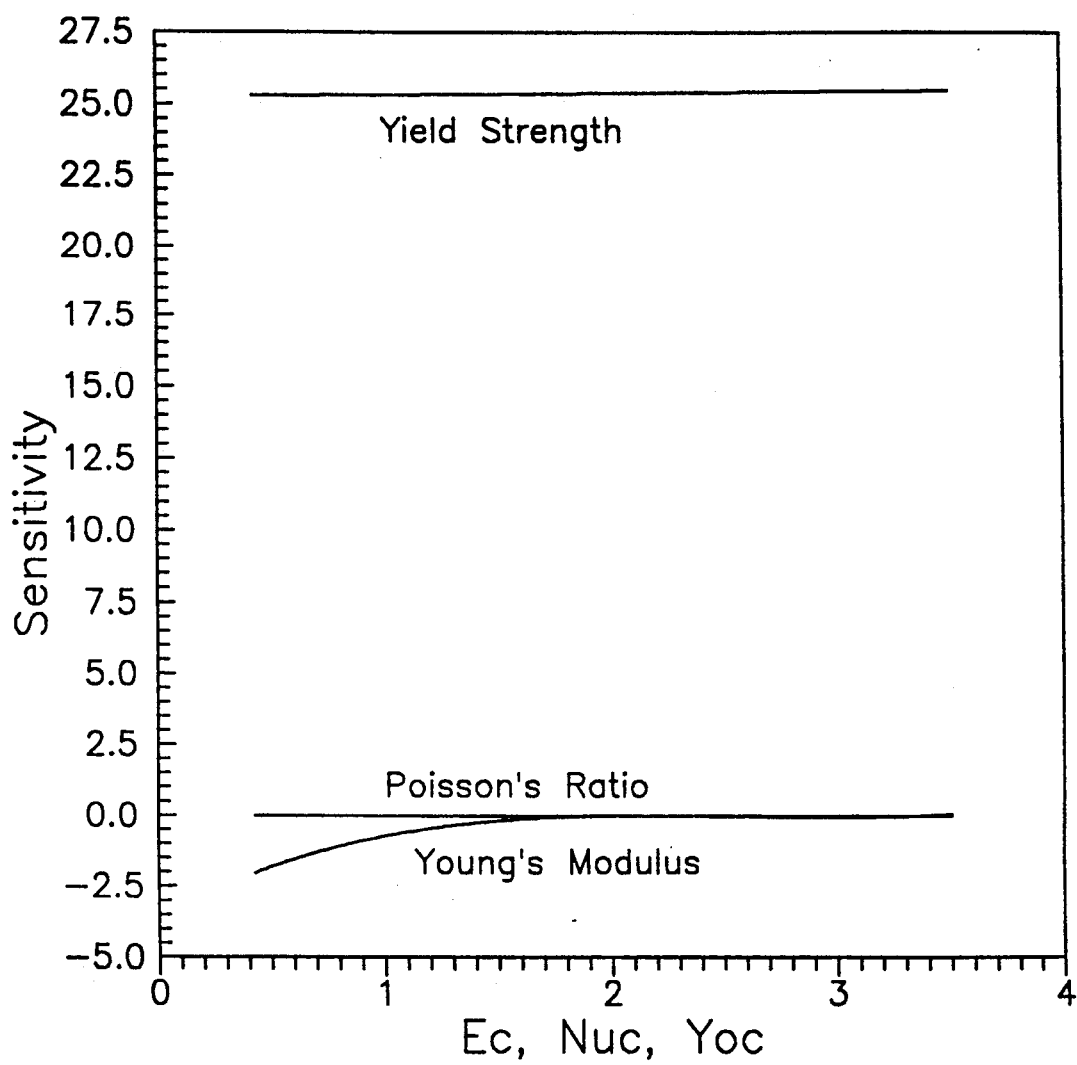
FIG. 6 shows a sensitivity of the axial load damage threshold to yield strength, Young's Modulus, and Poisons Ratio as a function of coating thickness.
Figure 7:
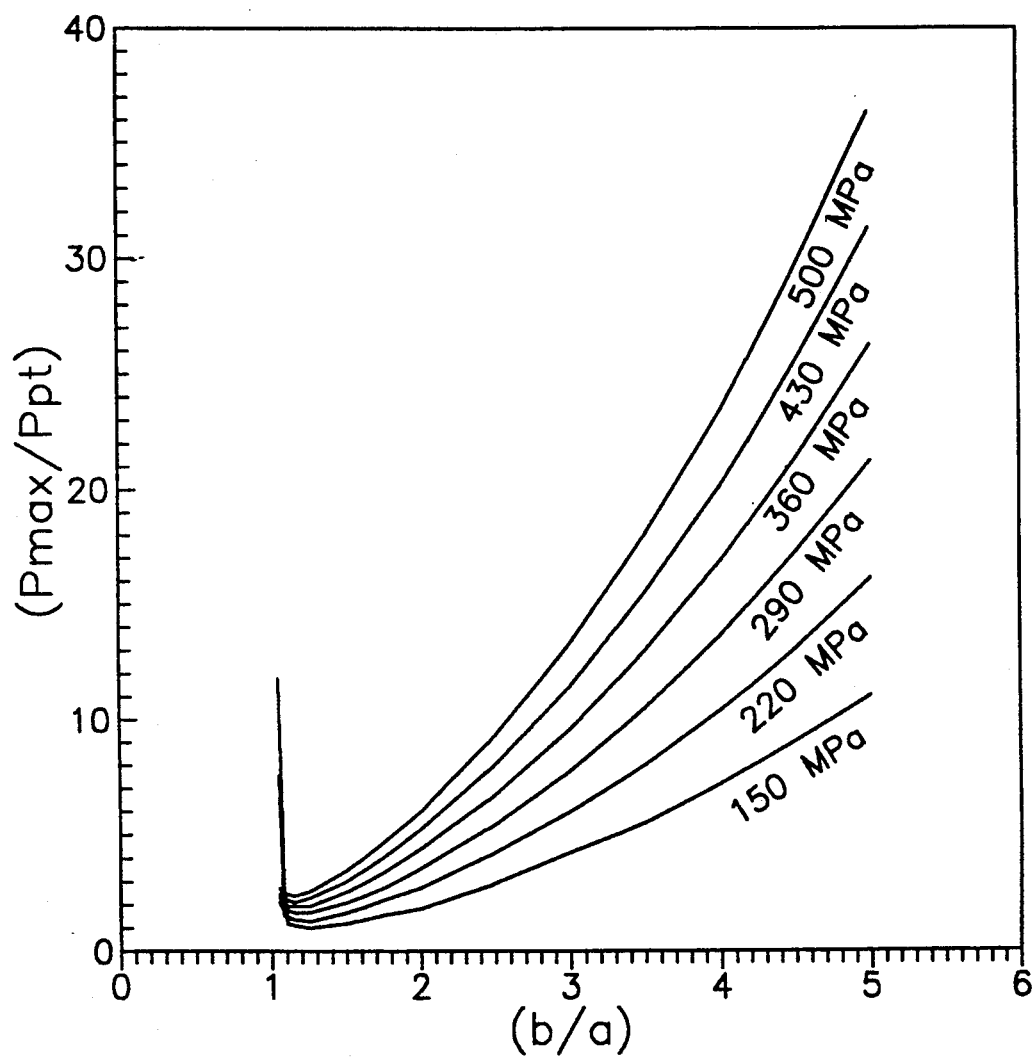
FIG. 7 shows axial load damage threshold as a function of coating thickness for several coating yield strengths ($E_c = 70$GPa, $\nu_c = .33$).

FIG. 5 shows that the minimum force required to cause a residual phase shift falls near a b/a ratio of 1.25 for all the exhibited coating materials. The portion of these curves to the right of the minimum is critical for designing the damage detection sensor. By correlating the properties of the coating materials provided in Table 1 with the curves in FIG. 5, the yield strength of the coating dominates the sensor performance, with Young's modulus and Poisson's ratio playing much smaller roles. To examine this characteristic, the sensitivity of the minimum residual phase to changes in the coating yield strength, Young's modulus, and Poisson's ratio, respectively, are defined as follows:

$$S_{\sigma o} = \frac{\partial(P_{MAX}/P_{PT})}{\partial(\sigma_o/\sigma_{PT})} ; \quad (3)$$

$$S_E = \frac{\partial(P_{MAX}/P_{PT})}{\partial(E_c/E_f)} ;$$

$$S_v = \frac{\partial(P_{MAX}/P_{PT})}{\partial(v_c/v_f)} ;$$

where $P_{PT}$ and $\sigma_{PT}$ refer to proof test force and stress levels respectively for a standard single mode optical fiber. The sensitivities defined above are provided for b/a=5, in FIG. 6 and are found to reinforce the heuristic findings of FIG. 5. There is practically no change in the axial load to produce a residual phase shift ($P_{MAX}$) as a function of Poisson's ratio; and while the Young's modulus does affect the residual phase, its influence is an order of magnitude smaller than that of the yield strength. Comparisons of the sensitivities for b/a ratios other than 5 show responses similar to FIG. 6. FIG. 6 also shows that the sensitivity to yield strength is almost constant, confirming the intuitive phenomenon that $P_{MAX}$ increases linearly with $\sigma_o$. This finding follows intuition in that the yield strength simply defines the initiation of yield. This characteristic is further shown in FIG. 7 where the threshold axial force as a function of coating radius is provided for six yield strength levels of an aluminum alloy coating (E=70 GPa, $v$=.33, and $\sigma_o$=290 MPa). There is almost a linear increase in the slopes of the individual coating responses with increasing yield strength for b/a>2, and a second order increase for b/a<2. The minimum axial force level required to produce a residual phase shift still remains near a b/a ratio of 1.25, but the value of the minimum force increases with the yield strength.

For use of the sensor in a required structure such as an airplane wing or bridge structure, one would first select an optical fiber for use within that structure. Next, a determination of the structures damage load for the sensor to monitor would be determined. From this information, the critical (b/a) ratio of the detection material would be specified using the information shown in FIG. 5. The optical fiber with detection coating would be made in accordance with this critical dimensional requirement for embedding in the structure's host material.

To make the damage sensor, several methods are available. First, from an available source of material, an electroless process can deposit the detection material to the required radial thickness "b". A second approach is a sputtering method where a first extremely thin layer of conducting material is sputtered onto the optic fiber followed by an electroless process for depositing the final layer to the required radial thickness "b". Another method includes "hot dipping" a fiber in a molten bath of the coating material for the coating deposition to take place to the required radius "b". This method uses fused silica (fiber material) which melts at approximately 1100 degrees C. while for example, an aluminum coating melts at 700 degrees C.

The sensor as described above and shown in FIG. 1 can be embedded in thermoset or thermoplast polymer matrix materials by placing the sensor between laminates during the lay-up process. The composite laminate structure then goes through standard curing cycles for completion of the process.

Figure 8:
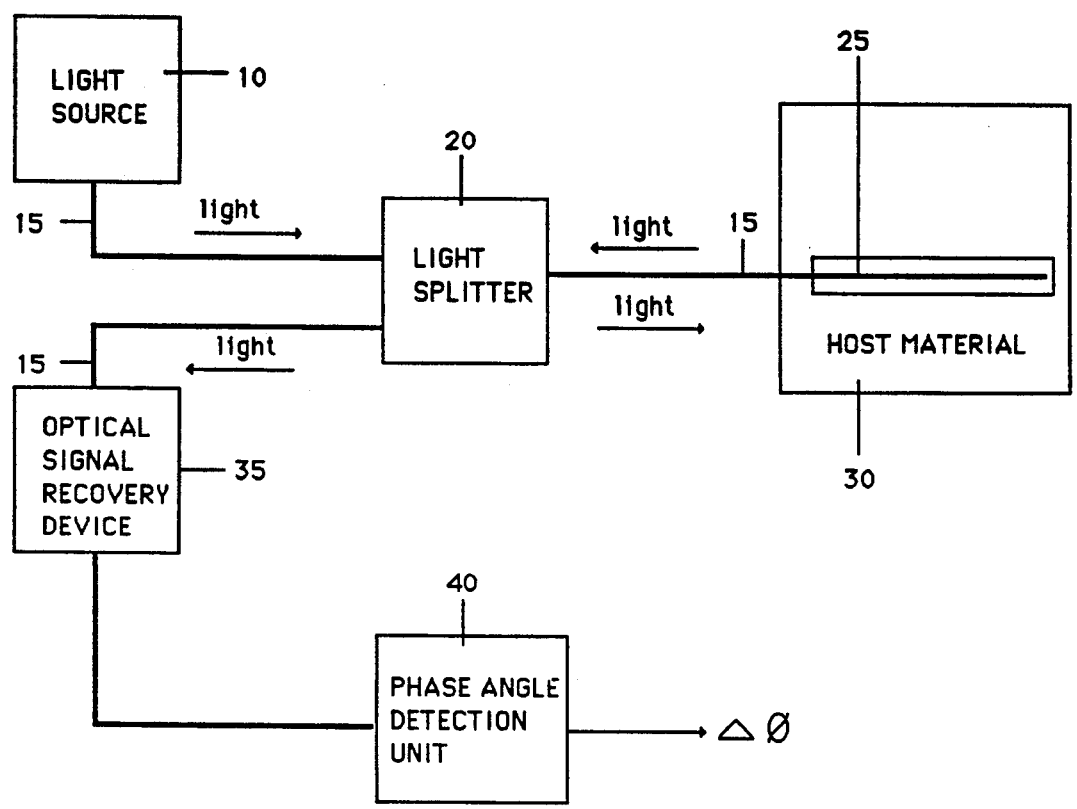
FIG. 8 shows the optical damage detection system for determining the permanent phase angle shift at the output of the sensor.

The system as shown in FIG. 8 illustrates the basic system configuration which incorporates the sensor (25). The components include a light source (10), i.e. a diode laser, that is coupled to a light splitter (20), i.e. a 2×2 coupler, through an optical fiber element (15) that then sends the light sources signal to the damage sensor (25) that is embedded in the host structural material (30), i.e. an airplane wing or building structure or composite material. In turn, the damage detector sensor reflects and transmits the light back through the light splitter that is received by a photo detector (35) that transduces the light signal that is received by the signal phase angle demodulation detection unit (40), i.e. a microprocessor, analog device or other signal processing means. From this detection unit (40), the history of the permanent deformation stresses induced in the structure can be obtained or provide instantaneous monitoring information.

While the above invention has been shown and described in relation to particular non-destructive fiber optic sensors for damage, it will be understood by those skilled in the art that various changes or modifications could be made without varying from the scope of the present invention. For example the choice of waveguide geometric configuration. Another variation of the device can be a fatigue or impact damage sensor since these damage mechanisms manifests themselves in structural degradation in a manner similar to overload damage. Another variation includes the use of coating materials that are perfectly plastic or obey kinematic work hardening or other equivalent material characteristics.

I claim:

1. In an optical fiber damage sensor within a structure comprising: a cylindrical optical fiber with a cross sectional radius "a" embedded in a structural host material of the structure having reinforcing fibers juxtaposed to the optical fiber; a detection coating disposed on said optical fiber with a radial thickness "b" that is concentric with the optical fiber that also has a property which varies with plastic deformation; the optical fiber is a means for detecting a permanent change in optical properties in an output from the sensor that corresponds to a condition where a predetermined level of the plastic deformation occurs without damage to the sensor; the improvement comprising:
a critical (b/a) ratio which is the radial thickness of the detection coating to the fiber optic radius that is determined by: (i) a predetermined threshold damage level of the structural host material of the structure; (ii) the selected optical fiber to be used in the structural host material; and (iii) mechanical properties of the detection coating determined by an elastic-plastic stress analysis of the embedded optic fiber with detection coating, a plastic flow rule, a yield criterion, a thermo-mechanical loading of the embedded coated fiber, a constitutive model of the detection coating and an optical property-strain-temperature model.

2. The damage sensor of claim 1 wherein said detection coating is a metal coating, the constitutive model is a linear work hardening elastic-plastic material, the plastic flow rule uses a Prandtl-Reuss flow rule, the yield criterion uses a von Mises yield criterion, the thermo-mechanical loading of the embedded coated fiber uses an axial-thermal-radial pressure model and the optical property-strain-temperature model is a phase shift-strain-temperature model.

3. The damage sensor of claim 2 wherein the metal coating is gold.

4. The damage sensor of claim 2 wherein the metal coating is silver.

5. The damage sensor of claim 2 wherein the metal coating is copper.

6. The damage sensor of claim 2 wherein the metal coating is aluminum.

7. The damage sensor of claim 1 wherein the structural host material is a composite material.

8. A method of implementing a fiber-optic damage sensor within a structural host material comprising the steps of:
(a) selecting a cylindrical optical fiber with a radius "a";
(b) coating the cylindrical optical fiber with a detection coating with a radius "b" that is concentric with the optic fiber radius such that a critical (b/a) ratio which is the radial thickness of the detection coating to the fiber optic radius that is determined by: (i) a predetermined threshold damage level of the structural host material of the structure; (ii) the selected optical fiber to be used in the structural host material; and (iii) mechanical properties of the detection coating determined by an elastic-plastic stress analysis of the embedded optic fiber with detection coating, a plastic flow rule, a yield criterion, a thermo-mechanical loading of the embedded coated fiber, a constitutive model of the detection coating and an optical property-strain-temperature model;
(c) embedding the coated optical fiber in the structural host material so that the reinforcing fibers in the structural host material are juxtaposed to the coated optical fiber; and
(d) connecting the sensor to a sensing means for detecting plastic deformation by detecting a permanent change in optical properties in the sensor output for a predetermined threshold damage level of an external load imposed on the structural host material without damaging the sensor.

9. The method of claim 8 wherein the structural host material is composite material.

10. A damage detection sensor and system wherein a fiber optic damage detection sensor is embedded in a structural host material of a structure comprising:

(a) a non-destructive type fiber optic damage detection sensor which includes a fiber optical sensing element with a radius "a", and a detection coating material with a concentric radius "b", the fiber optic damage detection sensor has a critical (b/a) ratio that is determined by: (i) a predetermined threshold damage level of the structural host material of the structure, (ii) the selected optical fiber used in the structural host material and (iii) mechanical properties of the detection coating determined by an elastic-plastic stress analysis of the embedded optic fiber with detection coating, a plastic flow rule, a yield criterion, a thermo-mechanical loading of the embedded coated fiber, a constitutive model of the detection coating and an optical change-strain-temperature model;

(b) the fiber optic damage detection sensor is disposed within the structural host material of the structure;

(c) an optical coupling means is attached to the fiber optic damage detection sensor;

(d) a light source means for transmission of light to the fiber optic damage detection sensor; and (e) an optical signal recovery means for detection of changes in optical properties of the light from the fiber optic damage detection sensor and outputting deformation information of the structural host material.

11. The damage detection sensor system of claim 10 wherein the structural host material is a composite material.

* * * * *